(12) United States Patent
Barnett (10) Patent No.: US 7,308,947 B2
(45) Date of Patent: Dec. 18, 2007

(54) CONNECTION OF THE HITCH ARM OF A PULL-TYPE CROP HARVESTING MACHINE TO A TRACTOR

(75) Inventor: Neil Gordon Barnett, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 150 days.

(21) Appl. No.: 11/362,523

(22) Filed: Feb. 27, 2006

(65) Prior Publication Data

US 2007/0199292 A1  Aug. 30, 2007

(51) Int. Cl.
*A01B 59/06* (2006.01)
*A01B 59/043* (2006.01)
*A01B 63/02* (2006.01)
*A01B 63/118* (2006.01)

(52) U.S. Cl. .................. 172/439; 180/53.3; 56/14.9

(58) Field of Classification Search ............... 172/439, 172/449, 679, 677, 680; 280/492, 493, 494, 280/497; 180/53.1, 53.3, 53.4; 56/15.7, 56/15.9, 14.9, 15.6, DIG. 14
See application file for complete search history.

(56) References Cited

U.S. PATENT DOCUMENTS 4,838,358 A  6/1989 Freudendahl
5,531,283 A * 7/1996 Austin et al. ............... 180/53.1
5,706,901 A * 1/1998 Walters et al. .............. 172/439
6,625,964 B2  9/2003 McLeod et al.
7,055,618 B2 * 6/2006 Ehrhart et al. .............. 172/449

* cited by examiner

*Primary Examiner*—Árpád Fábián Kovács
(74) *Attorney, Agent, or Firm*—Adrian D. Battison; Michael R. Williams; Ryan W. Dupuis

(57) ABSTRACT

A pull-type crop harvesting machine has a header carried on a frame mounted on ground wheels with a hitch arm extending from the frame over the header to a hitch connector of a tractor. The hitch arm is mounted for pivotal movement about a generally upright axis such that in a first position the tractor tows the frame in echelon to one side and in a second position the tractor tows the frame in echelon. There is provided connecting assembly for connecting the forward end of the hitch arm to a hitch connector of the tractor and a mechanical connection from the PTO of the tractor to a pump for hydraulically driving the cutting assembly. The connecting assembly provides three axes of pivotal movement for up and down, tilting and side to side movement of the header relative to the tractor. These axes are defined by pivot couplings which are stacked so that the forward end of the hitch arm extends over the connecting assembly and the pump so that the mechanical connection to the pump passes underneath forward end of the hitch arm.

20 Claims, 6 Drawing Sheets

Fig. 5

CONNECTION OF THE HITCH ARM OF A PULL-TYPE CROP HARVESTING MACHINE TO A TRACTOR

This invention relates to a pull-type crop harvesting machine of the type including a header carried on a frame to be towed behind a tractor and particularly to a connection between the hitch arm and the tractor, which includes a pivotal towing connection and a mechanical drive connection for providing power to a pump of a hydraulic drive of the machine.

BACKGROUND OF THE INVENTION

Pull type harvesting machines are towed from the tractor by a hitch arm which requires to be adjusted in angle relative to the frame of the machine for fine steering movements and more coarse movement to the transport position.

Some machines are required to follow the tractor only to one side and thus include a hitch arm which is located at one end of the machine. In others in which the present invention is particularly effective, the hitch arm to the tractor extends from the frame over the header to a hitch coupling and can be swung by an operating cylinder from one side of the header to the other so that the header can be located in echelon with the tractor to one side and symmetrically to the other side.

Pull-type harvesting machines of this type are well known and there are many different examples manufactured by a number of different companies.

The pull type harvesting machines that are mechanically driven use a coupling which attaches the hitch arm to the tractor together with a mechanical linkage which connects to the power take off shaft of the tractor to communicate the driving power from the PTO shaft to the mechanically driven elements of the header.

Disc headers which utilize as the cutting system a plurality of spaced discs across the width of the header with each disc rotating about a respective vertical axis are known and widely used. In view of the relatively high power consumption of disc headers, it is often desirable to communicate the drive hydraulically. A drive with a high power requirement is not typically better suited to be hydraulic. In fact it would often be better suited for the drive to be mechanical, as hydraulic drive would generally result in poorer drive transmission efficiencies than mechanical systems. However the hydraulic drive system generally offers more accurate control of input torque, less maintenance of the system, and fewer moving parts.

Thus a pump is provided adjacent the forward end of the hitch arm which attaches to the power take off shaft of the tractor. The pump generates a flow of high pressure hydraulic fluid which passes through a hydraulic line from the pump along the hitch arm to a motor at the cutter system. A return line runs from the motor back to a filter and from the filter into a sump tank which is commonly provided as the hollow interior of the tubular hitch arm.

A simple construction provides a mechanical connection of the forward end of the hitch arm to the draw bar of the tractor so that the hitch arm is directly attached to the draw bar of the tractor. In a simple construction commonly the pump is simply a separate item which attaches to the PTO shaft and is supported thereby. This arrangement is adequate for lower powered systems where the weight of the pump is relatively low so that it avoids applying significant loading to the PTO shaft which could cause damage.

However in higher power systems, it is desirable that the pump is mounted on the hitch construction so that it is properly supported from the draw bar with little or no loads being transferred to the PTO shaft.

One example of an arrangement of this type is shown in U.S. Pat. No. 4,838,358 (Freudendahl) issued Jun. 13, 1989. This discloses an arrangement of this type which attaches the forward end of the hitch arm to a tractor either to a draw bar or to the lower arms of the three point hitch and also attaches the pump to the tractor in a manner which supports the pump from the draw bar or the hitch rather than from the PTO shaft.

This arrangement has however a number of disadvantages in that different designs are provided for the draw bar construction and for the three-point hitch construction and of course it is highly desirable that a common design is provided. Furthermore the arrangement locates the pump at a forward position which reduces the length of the connecting shaft which can be connected between the pump and the PTO shaft which thus reduces manoeuverability.

In addition this arrangement provides no attention to the requirement for cooling of the hydraulic system particularly when high power transfer is required since high power of course generates a high level of heat in the pump and the motor.

Another arrangement is disclosed in U.S. Pat. No. 6,625,964 (McLeod) issued Sep. 30, 2003. This construction provides a complex device for towing equipment in a row one behind the other which has achieved no commercial success.

SUMMARY OF THE INVENTION

It is one object of the invention to provide an improved machine of the above type.

According to one aspect of the invention there is provided a pull-type crop harvesting machine for towed movement by a tractor comprising:

a frame mounted on ground wheels for movement across ground carrying a standing crop for harvesting;

a header including a cutter system mounted across a front of the frame so that the frame carries the header into the standing crop for cutting the standing crop and converging the cut crop into a crop discharge;

a hitch arm extending from the frame to a forward end of the hitch arm arranged for attachment to a hitch connector of a tractor by which the frame and the header are towed across the ground;

the hitch arm being connected to the frame for pivotal movement about a generally upright axis so as to be movable between a first position and a second position;

a hydraulic pump for generating a flow of hydraulic fluid under pressure;

a hydraulic motor for driving the cutter system;

a hydraulic circuit for communicating the flow from the pump to the motor and back to the pump;

a mechanical drive connection for connecting the pump to a PTO shaft of the tractor;

and a connecting assembly for connecting the forward end of the hitch arm to a hitch connector of the tractor comprising:

a first coupling member arranged for connection to the hitch connector of the tractor and arranged to provide relative to the hitch connector a first pivot coupling which defines a transverse axis of pivotal movement which is generally horizontal and transverse to the tractor so as to allow a rear end of the first coupling member to move upwardly and downwardly relative to the hitch connector and the tractor;

a second coupling member mounted at the rear end of the first coupling member;

a second pivot coupling connecting the second coupling member to the first coupling member which allows pivotal movement of the second coupling member relative to the first coupling member about a longitudinal axis which is generally horizontal and lies in a plane longitudinal of the tractor so as to allow side to side tilting movement of the second coupling member relative to the hitch connector and the tractor;

a third pivot coupling connecting the hitch arm to the second coupling member which allows pivotal movement of the hitch arm relative to the second coupling member about an upright axis which is generally upright so as to allow side to side movement of the header relative to the hitch connector and the tractor;

the pump being mounted on the second coupling member.

While the machine may be connected to the hitch arm in a manner which allows movement of the whole machine from an echelon position on one side of the tractor to an echelon position on the other side, the present invention is not so limited and the side to side movement defined above may be merely movement in the side to side direction regardless of the extent of movement.

The hydraulic system could drive only the cutting system or the entire header.

This connection to the tractor is designed so that the first coupling member can include an adapter member for attachment to a draw bar hitch connector of the tractor, the adapter member including a first portion which rigidly attaches to the draw bar and a second portion which pivots relative to the first portion about the transverse axis to define the first pivot coupling. In addition the first coupling member can include an adapter member for attachment to two lower arms of a three point hitch connector of the tractor, the adapter member including a transverse bar which connects across the lower arms and a second portion which hooks onto and pivots relative to the transverse bar about the transverse axis to define the first pivot coupling. Thus the construction defined herein can accommodate both towing by the draw bar of the tractor or the lower arms of the three point hitch of the tractor depending upon the requirements of the farmer/operator.

Preferably the hitch arm includes a tubular beam which is closed at its ends to form the sump tank.

Preferably the hydraulic connection lines include hoses which extend from the pump to the forward end of the hitch arm.

Preferably the third pivot coupling is connected the to second coupling member at a position thereon at a height above that of the pump such that the mechanical drive connection passes underneath the third pivot coupling.

Preferably the third pivot coupling is connected to the second coupling member at a position thereon forwardly of the pump.

Preferably a forwardmost end of hitch arm is arranged forwardly of the third pivot coupling.

Preferably there is provided a forward portion of the hitch arm which extends rearwardly from a forwardmost end of the hitch arm and which is pivotally connected by the third pivot coupling to a portion of the second coupling member which extends forwardly.

Preferably the hydraulic connection lines include hoses which extend from a rear of pump over the pump and through the portion of the second coupling member, through the third pivot coupling and through the forward portion of the hitch arm to the forwardmost end of the hitch arm.

Preferably the hoses flex to accommodate the side to side movement of the header. However as an alternative, there may be provided live couplings which provide a swivel joint at which the side to side movement is accommodated, thus reducing or eliminating the flexing of hoses.

According to a second aspect of this invention there is provided a pull-type crop harvesting machine for towed movement by a tractor comprising:

a frame mounted on ground wheels for movement across ground carrying a standing crop for harvesting;

a header including a cutter system mounted across a front of the frame so that the frame carries the header into the standing crop for cutting the standing crop and converging the cut crop into a crop discharge;

a hitch arm extending from the frame to a forward end of the hitch arm arranged for attachment to a hitch connector of a tractor by which the frame and the header are towed across the ground;

the hitch arm being connected to the frame for pivotal movement about a generally upright axis so as to be movable between a first position and a second position;

a hydraulic pump for generating a flow of hydraulic fluid under pressure;

a hydraulic motor for driving the cutter system;

a hydraulic circuit for communicating the flow from the pump to the motor and back to the pump;

a mechanical drive connection for connecting the pump to a PTO shaft of the tractor;

and a connecting assembly for connecting the forward end of the hitch arm to a hitch connector of the tractor comprising:

the connecting assembly providing relative to the hitch connector a first pivot coupling defining a transverse axis of pivotal movement which is generally horizontal and transverse to the tractor so as to allow upward and downward movement of the header relative to the tractor, a second pivot coupling defining a longitudinal axis of pivotal movement which is generally horizontal and lies in a plane longitudinal of the tractor so as to allow side to side tilting movement of the header relative to the tractor and a third pivot coupling defining an upright axis of pivotal movement which is generally upright as to allow side to side movement of the header relative to the tractor;

wherein the third pivot coupling is located at a height above that of the pump such that the mechanical drive connection passes underneath the third pivot coupling.

According to a third aspect of this invention there is provided a pull-type crop harvesting machine for towed movement by a tractor comprising:

a frame mounted on ground wheels for movement across ground carrying a standing crop for harvesting;

a header including a cutter system mounted across a front of the frame so that the frame carries the header into the standing crop for cutting the standing crop and converging the cut crop into a crop discharge;

a hitch arm extending from the frame to a forward end of the hitch arm arranged for attachment to a hitch connector of a tractor by which the frame and the header are towed across the ground;

the hitch arm being connected to the frame for pivotal movement about a generally upright axis so as to be movable between a first position and a second position;

a hydraulic pump for generating a flow of hydraulic fluid under pressure;

a hydraulic motor for driving the cutter system;

a hydraulic circuit for communicating the flow from the pump to the motor and back to the pump;

a mechanical drive connection for connecting the pump to a PTO shaft of the tractor;

and a connecting assembly for connecting the forward end of the hitch arm to a hitch connector of the tractor comprising:

the connecting assembly providing relative to the hitch connector a first pivot coupling defining a transverse axis of pivotal movement which is generally horizontal and transverse to the tractor so as to allow upward and downward movement of the header relative to the tractor, a second pivot coupling defining a longitudinal axis of pivotal movement which is generally horizontal and lies in a plane longitudinal of the tractor so as to allow side to side tilting movement of the header relative to the tractor and a third pivot coupling defining an upright axis of pivotal movement which is generally upright as to allow side to side movement of the header relative to the tractor;

wherein the second pivot mounting is connected to the second coupling member at a position thereon forwardly of the pump;

wherein a forwardmost end of hitch arm is arranged forwardly of the second pivot mounting;

wherein there is provided a forward portion of the hitch arm which extends rearwardly from the forwardmost end of the hitch arm and which is pivotally connected to a portion of the second coupling member which extends forwardly;

and wherein the hydraulic circuit include hoses which extend from a rear of pump over the pump and through the portion of the second coupling member, through the third pivot mounting and through the forward portion of the hitch arm to the forwardmost end of the hitch arm.

The third pivot mounting may be formed with upper and lower pivot connections in which case the hoses pass between the connections or the third pivot mounting may include only two plates projecting forward from the second coupling member. In this design, the hoses would pass through the pivot either above or below the two plates.

The hoses may flex or may have live pivot connections.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
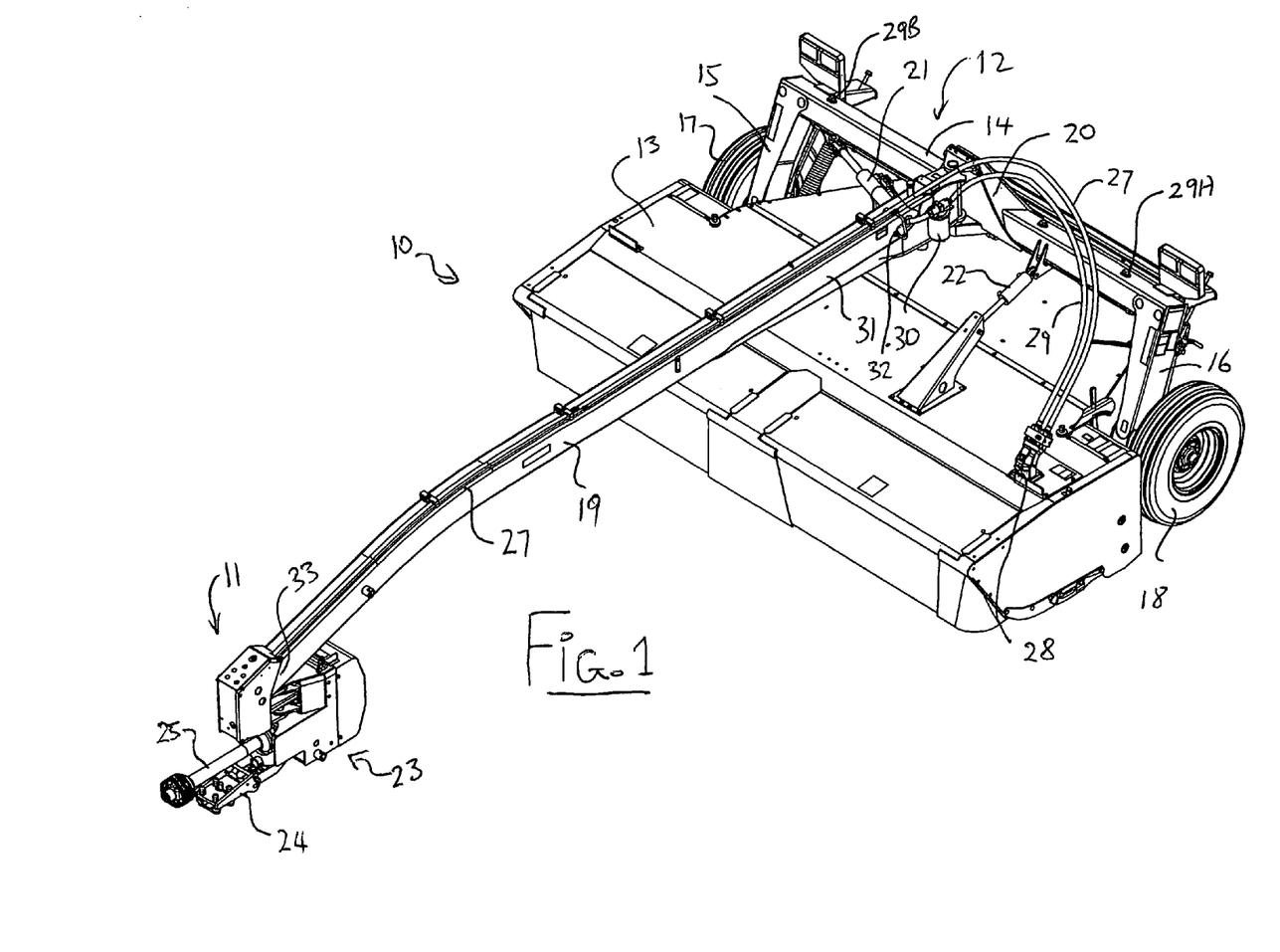
FIG. 1 is an isometric view of a pull type crop harvesting machine according to the present invention for attachment to a tractor, with the tractor omitted for convenience of illustration.
Figure 6:
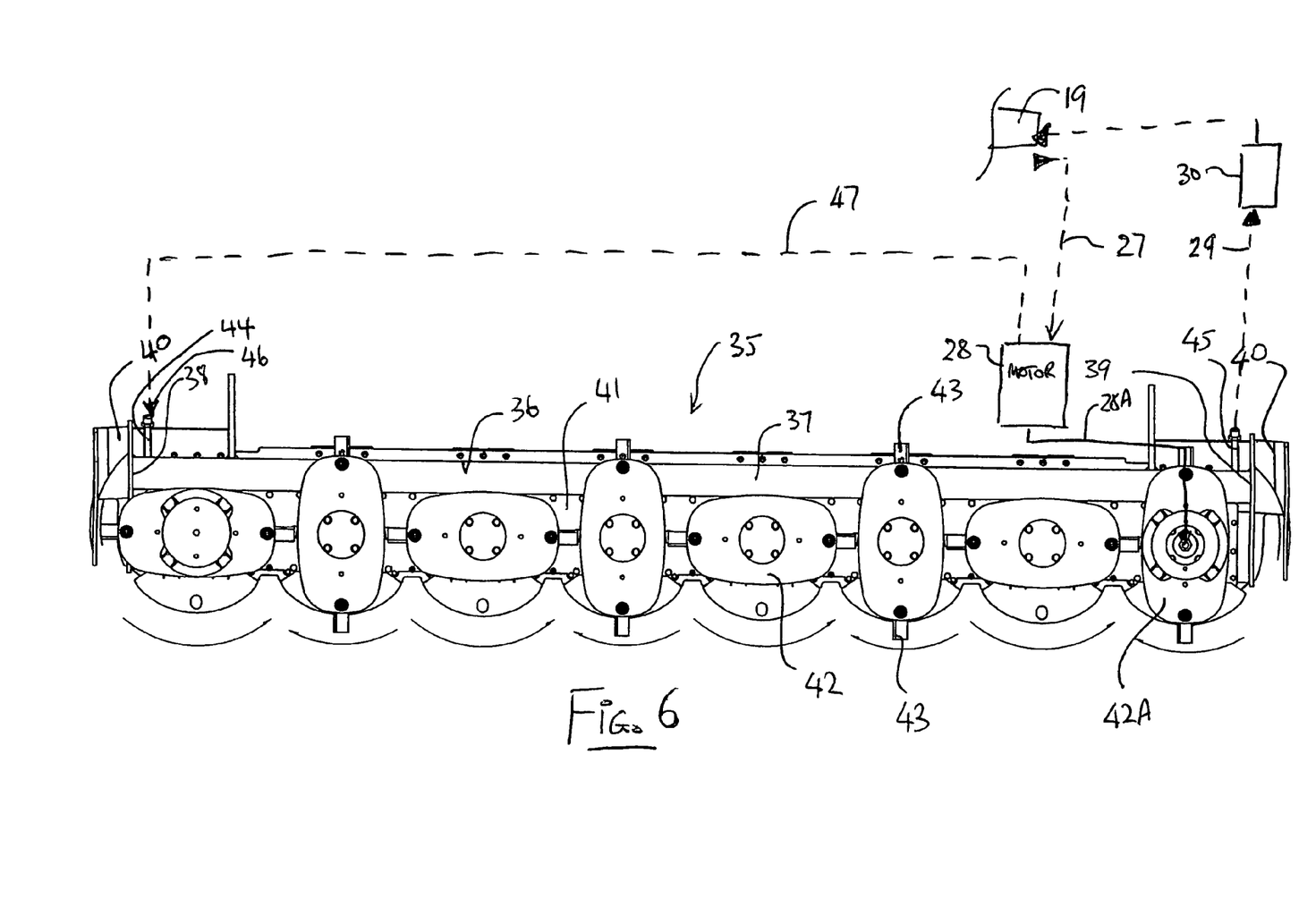
FIG. 6 is a top plan view of the cutter bar assembly of the harvesting machine of FIG. 1.

In FIG. 1 is shown a pull type harvesting machine generally indicated at 10 for attachment to a tractor (not shown) by a hitch coupling generally indicated at 11. The crop harvesting machine shown is of the type which uses a row of discs mounted on a cutter bar as shown in FIG. 6. Thus each disc is mounted on the cutter bar for rotation about its own axis with the axes spaced positions across the width of the cutter bar and when the axes generally vertical. The discs carry blades at 180° spacing of the discs so that the disc rotate 90° out of phase with the next adjacent disc thus allowing the cutting action of the blades to overlap. Arrangements of this type are well known and many examples can be found in the prior art. The cutter bar of FIG. 6 is mounted on a frame generally indicated at 12 and is covered by a housing generally indicated at 13 so that the cutter system is enclosed for safety.

The frame 12 includes a transverse beam 14 which extends across the width of the harvesting device to a pair of legs 15 and 16 which depend downwardly from the transverse beam 14 to support a pair of wheels 17 and 18 which carry the frame in movement across the ground.

A hitch arm 19 is attached to the transverse beam 14 by a mounting bracket 20. In the embodiment shown the bracket 20 is located at the center of the beam 14 so that the hitch arm 19 can pivot to one side or the other side under control of a cylinder 21. It will be appreciated that movement of the hitch arm to one side acts to tow the harvesting machine in echelon to one side of the tractor and pivotal movement of the hitch arm to the other side tows the harvesting machine in echelon to the opposite side. The hitch arm can also be located centrally in which case the harvesting machine is towed behind the tractor generally in a transport position. The height of the cutter bar from the ground is adjusted by a cylinder 22 which lifts the cutter bar and its supports relative to the transverse beam 14. This cylinder controls the angle of the header and thus allows for a fine control of cutting height. To lift the header, cylinders move the wheel arms which articulate relative to the frame 16. The wheel arms and header lift cylinders are not visible in FIG. 1.

The hitch arm 19 is attached to the tractor by a hitch coupling 23. The hitch coupling 23 includes a connector bracket 24 which attaches to the tractor hitch and includes a mechanical drive linkage 25 which communicates power from the PTO of the tractor to a pump 26 best shown in FIG. 4.

The pump 26 generates a flow of hydraulic fluid under pressure which is transmitted through a hydraulic line 27 to a motor 28 at the cutter bar. The motor 28 is located above one end cutter of the cutter bar and drives the cutter bar through a gear box (not shown) which provides power to the end cutter of the cutter bar and at the same time also provides a power output for driving a conditioner (not shown).

Fluid returning from the motor 28 passes along a return line 29 to a filter 30 and from the filter 30 enters a sump tank 31 defined by the hollow interior of the hitch arm 19. The hitch arm is thus closed at its rear end 32 by a closure wall and is also closed at its forward end 33 by a further closure wall so that it forms a container for the returning hydraulic fluid.

The cutter bar is shown in more detail in FIG. 6 generally indicated at 35 and includes a support frame 36 which is defined by a transverse tubular structural member 37 which extends from one end 38 to an opposed end 39. The tubular structural member 37 is closed at each end and thus forms a hollow interior. The structural member is formed from a steel tube of rectangular cross section and is attached at its ends to support members 40 which are connected to the frame 12 of the harvesting machine. The tubular member 37 provides a structural support for the main elements of the cutter bar 41 which carry the drive elements for the cutter discs generally indicated at 42. In the embodiment shown there are eight cutter discs but it will of course be appreciated that the number of discs can be increased or decreased as required. The discs are generally oval in shape with each carrying a pair of cutter blades 43 at diametrically opposed positions at the long axis of the disc. The cutter bar provides drive for the discs so that each is rotated about its own vertical axis with the axes spaced along the length of the cutter bar 41. The discs are turned so that they are 90° out of phase with the next adjacent disc so that the blades pass in an overlapping manner to provide a cutting action in front of the cutter bar as the cutter bar is moved forwardly over the ground.

The hollow interior of the tubular member 37 includes a first outlet port 44 at one end and a second outlet port 45 at the other end. These ports are simple pipes welded to one side face of the tubular member and in the embodiment shown these pipes project rearwardly from the vertical rear face of the tubular member and include a coupling 46 on the outer end for attachment to a hydraulic hose.

Also shown in FIG. 6 is the motor 28 which provides an output drive shaft 28A driving the end most disc 42A. This provides power to the cutter bar 41 which is transmitted through gear elements within the cutter bar (not shown) to each of the discs. Fluid from the hydraulic line 27 shown in FIG. 1 is communicated, as shown in FIG. 6, to the motor 28 from the pump. This fluid acts to drive the motor 28 and communicate power to the cutter bar and to a conditioner system (not shown) which is optional.

Fluid from the motor 28 passes through a line 47 to the inlet coupling 46 of the pipe 44 so that the fluid from the motor enters the hollow interior of the tubular member 37 and flows through the tubular member 37 to the outlet pipe 45 and its coupling 46. The outlet pipe is attached to the return line 29 which communicates to the filter 30 and from the filter into the hollow interior of the hitch arm 19.

Figure 2:
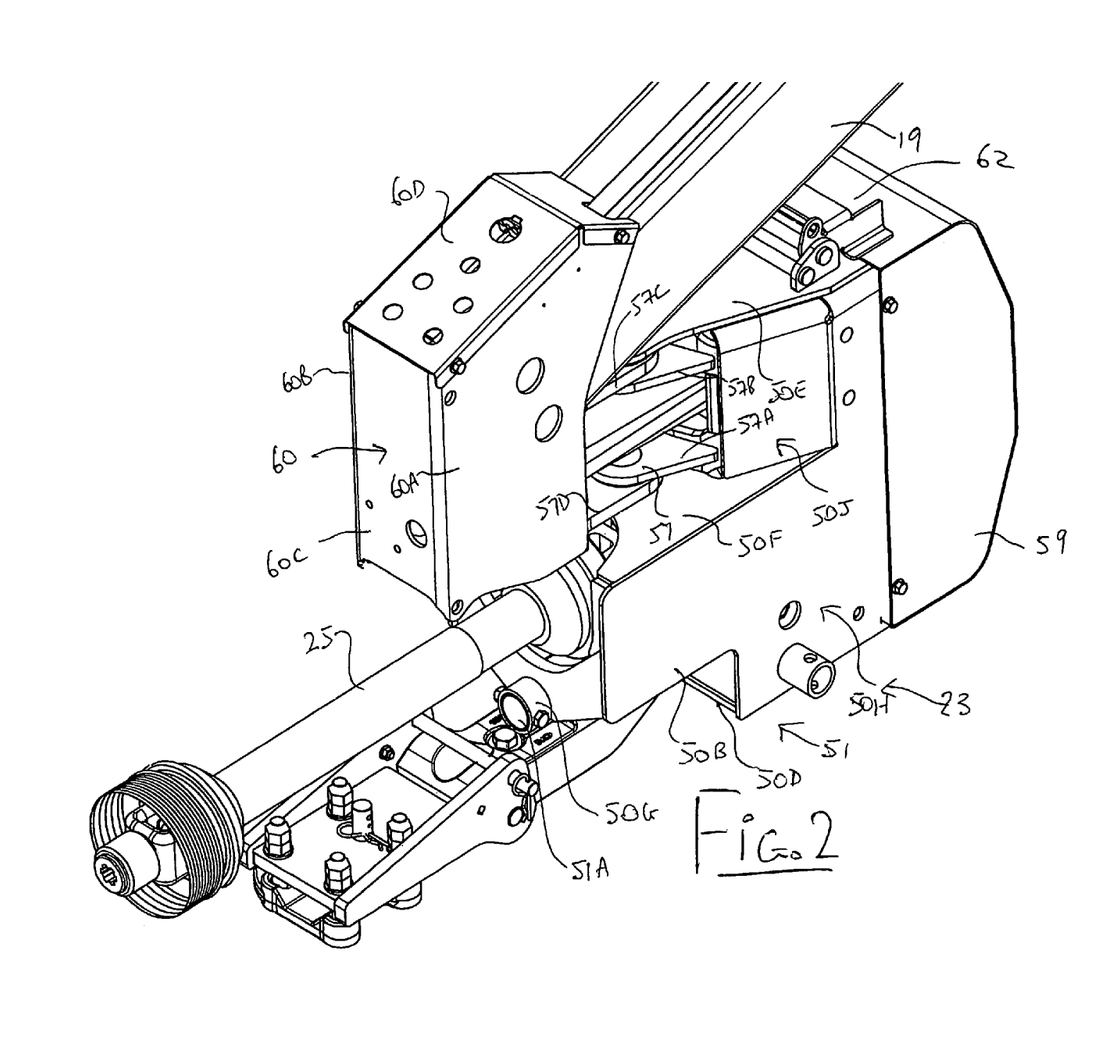
FIG. 2 is an isometric view of the connection member for connecting the forward end of the hitch arm to the draw bar and PTO shaft of the tractor.
Figure 4:
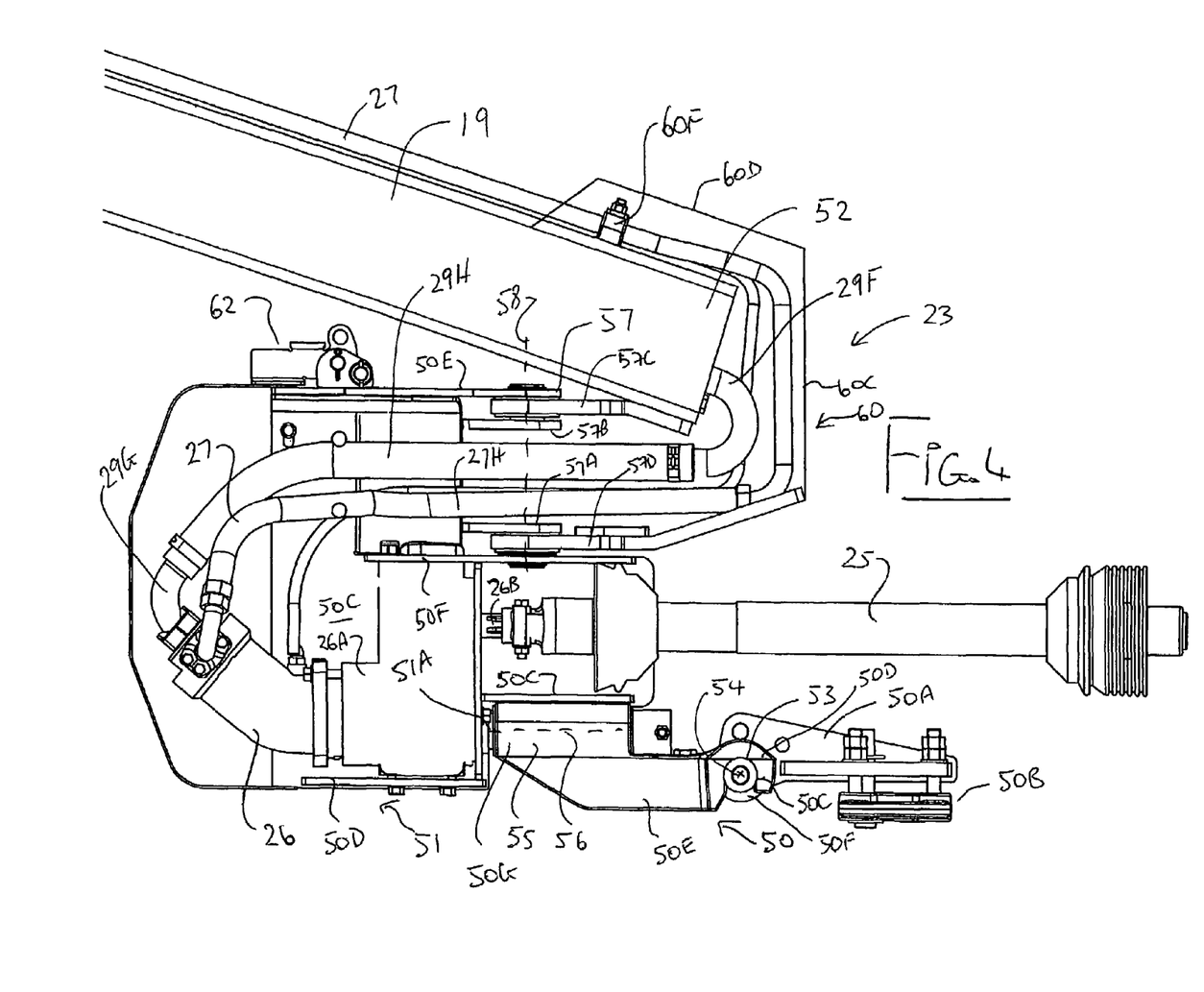
FIG. 4 is a side elevational view of the construction of FIG. 2.
Figure 5:
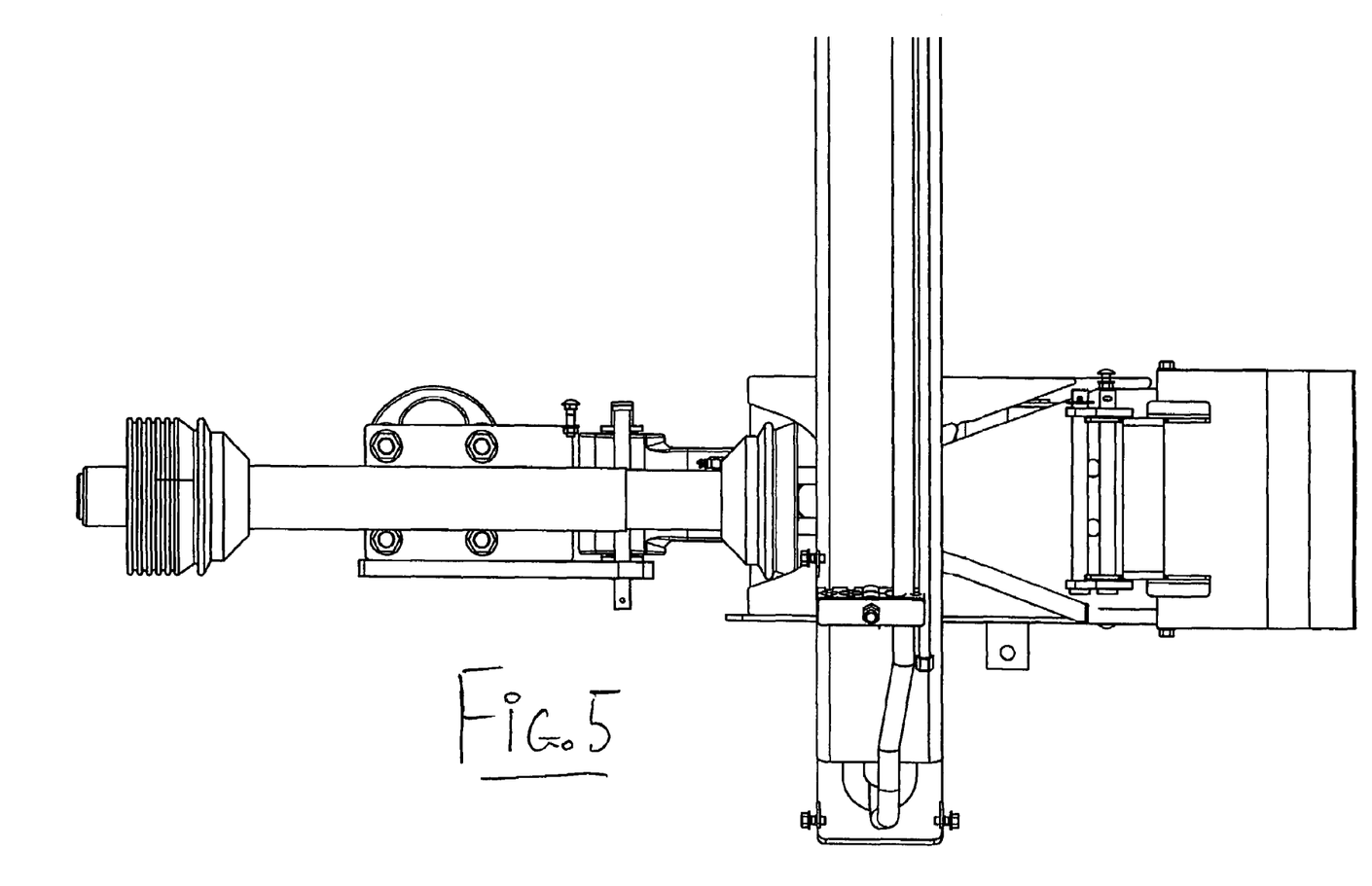
FIG. 5 is a top plan view of the construction of FIG. 2 showing the hitch arm pivoted into a position at right angles to the hitch coupling.

Turning now to FIGS. 2 and 4, further detail of the hitch coupling 23 is shown. This comprises a first coupling member 50 for attachment to the draw bar of the tractor. A second coupling member 51 is connected at the rear of the first coupling member 50. Second coupling member 51 attaches to the forward end 52 of the hitch arm 19. The first coupling member 50 provides a first pivot coupling 53 defining an axis of pivotal movement 54 which is generally horizontal and generally transverse to the direction of movement of the tractor. Between the first coupling member 50 and the second coupling member 51 is provided a second pivot coupling 55 which defines an axis 56 of pivotal movement which is generally longitudinal of the direction of movement of the tractor and generally horizontal. Thus the first axis 54 allows the first coupling member 50 upwardly and downwardly so that a rear end of the hitch coupling can move upwardly and downwardly relative to the draw bar to allow the implement to move upwardly and downwardly relative to the tractor. The second axis 56 allows tilting movement of the implement relative to the tractor. Thus on uneven terrain one wheel of the harvesting machine can move upwardly relative to the other while the twisting along the length of the hitch arm 19 which occurs is accommodated by the pivotal movement in the second pivot coupling 55.

Between the forward end 52 of the hitch arm 19 and the second coupling member 51 is provided a third pivot coupling 57 which defines an axis 58 of pivotal movement. This axis is generally vertical and at right angles to the axis 56 so that it allows the harvesting machine to move side to side relative to the tractor.

Thus as previously described, the cylinder 21 can be actuated to cause the hitch arm to pivot relative to the machine to move the implement from an echelon position at one side to an echelon position at the opposite side and this movement is accommodated by the pivotal movement about the axis 58.

It will also be appreciated that steering movement of the implement relative to the tractor also causes pivotal movement about the axis 58 so that the hitch arm 52 can swivel relative to the longitudinal direction of the tractor from an angle of approximately 110° on one side to the same angle approximately on the other side. These angles are generally limited by the position of the tires of the tractor on each side of the draw bar so that the hitch arm can only move to an angle at which it impinges upon tire. The location of the axis 58 relatively to the rear of the draw bar that is significantly behind the draw bar as described hereinafter increases the angle to which the hitch arm can be rotated relative to the draw bar around the axis 58. The first coupling member 50 comprises a first portion 50A and a rear second portion 50E. The first portion 50A includes a clamping member 50B which attaches to the draw bar of the tractor. From that clamping portion the first portion 50A extends rearwardly to a transverse shaft 50C which defines the axis 54. The second portion 50E includes a front hook section 50D with a latch 50F which holds the hook section on the shaft 50C to provide the first pivot coupling. Thus the front portion 50A is rigidly attached to the draw bar and extends rearwardly therefrom so that the axis 54 is located rearwardly of the drawbar. However the length of the portion 50A is relatively short in front of the axis 54 so that only limited cantilever loads are applied onto the draw bar since all of the elements rearwardly of the axis 54 can pivot upwardly and downwardly and thus apply only weight onto the shaft 50C rather than cantilever loads onto the portion 50A.

Portions 50E extends rearwardly from the hook portion 50D and defines a cradle for a tubular member or sleeve defining the outside of the second pivot coupling 55. Inside the sleeve indicated at 50G is provided a shaft 51A which defines the front of the second coupling member 51.

The second coupling member 51 is defined by a pair of side plates 50B and 50C which are connected by top and bottom plates 50D and 50E. An intermediate support plate 50F is parallel to the bottom plate 50D so as to define a lower part of the second coupling member. The lower part indicated generally at 50H contains a gear box 26A of the pump 26. The gear box is arranged to provide gear ratio between an input shaft 26B and an output shaft (not shown) driving the pump 26. This allows the speed of the pump to be controlled at a required speed relative to an input speed of the shaft 25 which connects at its forward end to the power take off shaft of the tractor. The shaft 25 thus has a coupling on its forward end and a coupling on its rear end with the latter coupling connecting to the shaft 26B. Couplings provide flexibility to allow the shaft to change in angles slightly relative to the power take off shaft and the input shaft 26B so as to accommodate the pivotal movement about the axes 54 and 56.

The pump 26 is thus mounted at the rear of the second coupling member 51 and has the output and input connections thereof at the rear end behind the rear of the second coupling member 51. The rear of the pump and the couplings for the hoses are covered by a cover member 59 which is bolted onto the side plates 50B and 50C so as to project rearwardly therefrom.

The third pivot coupling 57 is located in the second coupling member 51 at a position above the pump, above the gear box 26A and forwardly of both of those elements. Thus the second coupling member includes the upper portion 50J which is located above the intermediate plate 50F and below the top plate 50E. This acts to locate the third pivot coupling 57 above the input shaft 26B and above the shaft 25 which pass underneath this coupling into the gear box 26A. The pivot coupling 57 comprises a pair of plates 57A and 57B attached to the upper part 50J and extending forwardly therefrom toward the tractor. These cooperate with plates 57C and 57D of the coupling which are connected to a front mounting 60 attached to the forward end 52 of the hitch arm 19. The front mounting 60 comprises side plates 60A and 60B which are attached to the sides of the hitch arm 19. A front plate 60C is located as a cover beyond the end of the hitch arm 19 to provide a space between the front end 52 and the cover 60C. A further top plate 60D extends over the top of the end 52 again to provide a space between the inside of the cover 60D and the top wall of the hitch arm 19.

The output line 27 from the pump 26 passes through the upper portion of the second coupling member between the plates of the third coupling 57 and into the mounting 60 where it passes along the underside of the front end 52 of the hitch arm 19 and is connected by a mounting 60F to the top of the hitch arm 19. The supply line 27 then extends along the hitch arm to the rear end as previously described. A return hose 29F is connected to the hollow interior of the hitch arm 19 to receive fluid from the return tank defined by the hitch arm 19. The hose line 29F extends also through the mounting 60, through the third pivot coupling 57 and into the top part of the second coupling member where it is connected to the pump at an inlet 29G. The lines 27 and 29F are formed at their ends from rigid sections connected to the pump and connected to the hitch arm together with central flexing hose sections 29H and 27H. These flexing sections are located through the third pivot coupling 57 and thus can accommodate the rotation of the hitch arm 19 about the axis 58 by flexing in the area of the axis 58.

In an alternative arrangement, instead of having a split pivot 57, as illustrated (which has the advantage of decreasing the force on the pivot members in the third pivot), the pivot could be constructed shorter with only two plates projecting forward from the second coupling member 51. In this design, the hoses would pass through the pivot axis 58 either above or below the two plates.

The hoses extend generally rearwardly from the pump but may be actually connected to the pump at the rear or at the side and in FIG. 4 one comes from the side.

In an alternative arrangement, live swivel fittings can be used to bridge the hydraulic drive over pivot 3 in place of the flex hoses. In this case, the swivel occurs at or near pivot 3 and pipe 29F protrudes directly down from the tank through axis 58.

A latch 62 is mounted on the top plate 50E and can be moved from a lowered position shown in FIGS. 2 and 4 to a raised position on which it abuts the underside of the hitch arm 19 to maintain the hitch arm and the hitch coupling in a lined position when required.

It will be noted therefore that the three pivot couplings are arranged in stacked arrangements so that the pivot coupling 57 is above the pivot couplings 53 and 55. In addition the drive to the pump passes between these areas. This acts to move the pivot coupling 57 forwardly and to move the gear box rearwardly. The rearward movement of the gear box increases the length of the coupling shaft 25 to a length which can accommodate the changes in angle required. The movement of the forward end of the hitch arm 19 forwardly provides the S-shaped arrangement of the hoses interconnecting the end of the hitch and the pump so that these hoses can readily accommodate the flexing necessary at the pivot axis 58.

This arrangement also acts to mount the pump on the hitch mounting and particularly on the second portion of the hitch mounting so that it is effectively supported in a manner which avoids large changes in angle in the couplings at the shaft 25.

Figure 3:
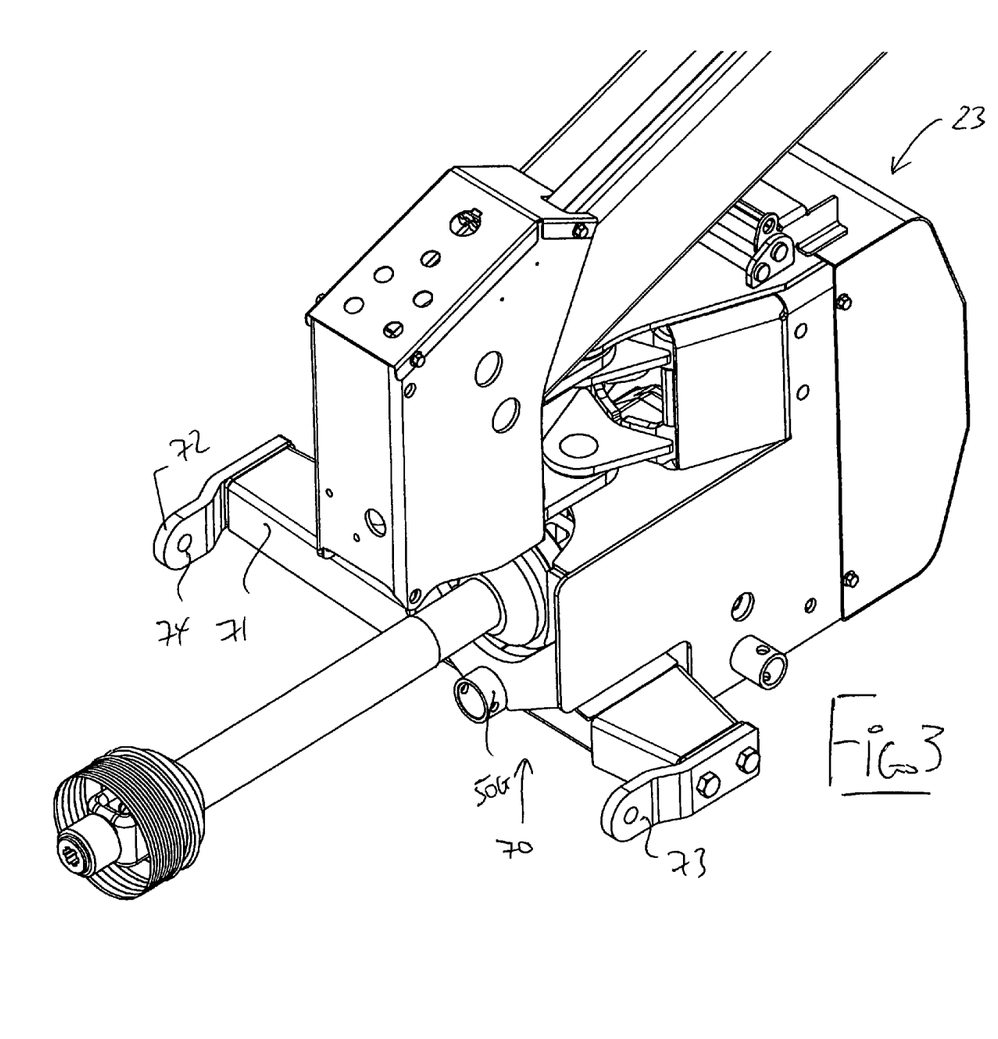
FIG. 3 is an isometric view similar to that of FIG. 2 showing the arrangement modified for attachment to the lower hitch arms of a three point hitch of a tractor.

In FIG. 3 is shown the same hitch coupling 23 with the same components as previously described with the exception that the first portion 50 is modified to provide a coupling 70 designed for attachment to the bottom arms of a three point hitch of the tractor. In this arrangement, therefore there is provided a transverse beam 71 which has attached at its ends lugs 72 and 73 which can be mounted on a transverse shaft (not shown) connected between lower hitch arms of a hitch of this type. The beam 71 is mounted on the pivot coupling 50G substantially as previously described so that the pivot coupling 50G provides the pivot axis 56. The pivot at the axis 53 is defined by the shaft passing through the holes 74 in the lugs 72 and 73.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A pull-type machine for towed movement by a tractor comprising:

a frame mounted on ground wheels for movement across ground carrying a standing crop for harvesting;

a header mounted across a front of the frame;

a hitch arm extending from the frame to a forward end of the hitch arm arranged for attachment to a hitch connector of a tractor by which the frame and the header are towed across the ground;

the hitch arm being connected to the frame for pivotal movement about a generally upright axis so as to be movable between a first position and a second position;

a hydraulic pump for generating a flow of hydraulic fluid under pressure;

a hydraulic motor for driving a driven component of the header;

hydraulic connection lines for communicating the flow from the pump to the motor and back to a sump tank;

a mechanical drive connection for connecting the pump to a PTO shaft of the tractor;

and a connecting assembly for connecting the forward end of the hitch arm to a hitch connector of the tractor comprising:

a first coupling member arranged for connection to the hitch connector of the tractor and arranged to provide relative to the hitch connector a first pivot coupling which defines a transverse axis of pivotal movement which is generally horizontal and transverse to the tractor so as to allow a rear end of the first coupling member to move upwardly and downwardly relative to the hitch connector and the tractor;

a second coupling member mounted at the rear end of the first coupling member;

a second pivot coupling connecting the second coupling member to the first coupling member which allows pivotal movement of the second coupling member relative to the first coupling member about a longitudinal axis which is generally horizontal and lies in a plane longitudinal of the tractor so as to allow side to side tilting movement of the second coupling member relative to the hitch connector and the tractor;

a third pivot coupling connecting the hitch arm to the second coupling member which allows pivotal movement of the hitch arm relative to the second coupling member about an upright axis which is generally upright so as to allow side to side movement of the header relative to the hitch connector and the tractor;

the pump being mounted on the second coupling member.

2. The machine according to claim 1 wherein first coupling member includes an adapter member for attachment to a draw bar hitch connector of the tractor, the adapter member including a first portion which rigidly attaches to the draw bar and a second portion which pivots relative to the first portion about the transverse axis to define the first pivot coupling.

3. The machine according to claim 1 wherein the first coupling member includes an adapter member for attachment to two lower arms of a three point hitch connector of the tractor, the adapter member including a transverse bar which connects across the lower arms and a second portion which hooks onto and pivots relative to the transverse bar about the transverse axis to define the first pivot coupling.

4. The machine according to claim 1 wherein the hitch arm includes a tubular beam and wherein the tubular beam is closed at ends thereof to form the sump tank.

5. The machine according to claim 1 wherein the hydraulic connection lines include hoses which extend from the pump to the forward end of the hitch arm.

6. The machine according to claim 1 wherein the third pivot coupling is connected the to second coupling member with the mechanical drive connection arranged relative to the third pivot coupling such that the mechanical drive connection passes to the pump underneath the third pivot coupling.

7. The machine according to claim 1 wherein the third pivot coupling is connected to the second coupling member at a position thereon forwardly of the pump.

8. The machine according to claim 1 wherein a forwardmost end of hitch arm is arranged forwardly of the third pivot coupling.

9. The machine according to claim 1 wherein there is provided a forward portion of the hitch arm which extends rearwardly from a forwardmost end of the hitch arm and which is pivotally connected by the third pivot coupling to a portion of the second coupling member which extends forwardly.

10. The machine according to claim 1 wherein the hydraulic connection lines include hoses which extend from the pump through the portion of the second coupling member so as to pass substantially through the axis of the third pivot coupling.

11. The machine according to claim 10 wherein the hoses flex to accommodate the side to side movement of the header.

12. A pull-type machine for towed movement by a tractor comprising:

a frame mounted on ground wheels for movement across ground carrying a standing crop for harvesting;

a header mounted across a front of the frame;

a hitch arm extending from the frame to a forward end of the hitch arm arranged for attachment to a hitch connector of a tractor by which the frame and the header are towed across the ground;

the hitch arm being connected to the frame for pivotal movement about a generally upright axis so as to be movable between a first position and a second position;

a hydraulic pump for generating a flow of hydraulic fluid under pressure;

a hydraulic motor for driving a driven component of the header;

hydraulic connection lines for communicating the flow from the pump to the motor and back to a sump tank;

a mechanical drive connection for connecting the pump to a PTO shaft of the tractor;

and a connecting assembly for connecting the forward end of the hitch arm to a hitch connector of the tractor comprising:

the connecting assembly providing relative to the hitch connector a first pivot coupling defining a transverse axis of pivotal movement which is generally horizontal and transverse to the tractor so as to allow upward and downward movement of the header relative to the tractor, a second pivot coupling defining a longitudinal axis of pivotal movement which is generally horizontal and lies in a plane longitudinal of the tractor so as to allow side to side tilting movement of the header relative to the tractor and a third pivot coupling defining an upright axis of pivotal movement which is generally upright as to allow side to side movement of the header relative to the tractor;

wherein the third pivot coupling is located such that the mechanical drive connection passes to the pump underneath the third pivot coupling.

13. The machine according to claim 12 wherein the hydraulic connection lines include hoses which extend from the pump to the forward end of the hitch arm.

14. The machine according to claim 12 wherein the third pivot coupling is located forwardly of the pump.

15. The machine according to claim 12 wherein a forwardmost end of hitch arm is arranged forwardly of the third pivot coupling and wherein there is provided a forward portion of the hitch arm which extends rearwardly from a forwardmost end of the hitch arm and which is pivotally connected by the third pivot coupling to a portion of the second coupling member which extends forwardly.

16. The machine according to claim 12 wherein the hydraulic connection lines include hoses which extend from the pump through the portion of the coupling member, so as to pass substantially through the axis of the third pivot mounting and wherein the hoses flex to accommodate the side to side movement of the header.

17. A pull-type machine for towed movement by a tractor comprising:

a frame mounted on ground wheels for movement across ground carrying a standing crop for harvesting;

a header mounted across a front of the frame;

a hitch arm extending from the frame to a forward end of the hitch arm arranged for attachment to a hitch connector of a tractor by which the frame and the header are towed across the ground;

the hitch arm being connected to the frame for pivotal movement about a generally upright axis so as to be movable between a first position and a second position;

a hydraulic pump for generating a flow of hydraulic fluid under pressure;

a hydraulic motor for driving a driven component of the header;

hydraulic connection lines for communicating the flow from the pump to the motor and back to a sump tank;

a mechanical drive connection for connecting the pump to a PTO shaft of the tractor;

and a connecting assembly for connecting the forward end of the hitch arm to a hitch connector of the tractor comprising:

the connecting assembly providing relative to the hitch connector a first pivot coupling defining a transverse axis of pivotal movement which is generally horizontal and transverse to the tractor so as to allow upward and downward movement of the header relative to the tractor, a second pivot coupling defining a longitudinal axis of pivotal movement which is generally horizontal and lies in a plane longitudinal of the tractor so as to allow side to side tilting movement of the header relative to the tractor and a third pivot coupling defining an upright axis of pivotal movement which is generally upright as to allow side to side movement of the header relative to the tractor;

wherein the second pivot mounting is connected to the second coupling member at a position thereon forwardly of the pump;

wherein a forwardmost end of hitch arm is arranged forwardly of the second pivot mounting;

wherein there is provided a forward portion of the hitch arm which extends rearwardly from the forwardmost end of the hitch arm and which is pivotally connected to a portion of the second coupling member which extends forwardly;

and wherein the hydraulic connection lines include hoses which extend from the pump through the portion of the second coupling member, so as to pass substantially through the axis of the third pivot mounting and through the forward portion of the hitch arm to the forwardmost end of the hitch arm.

18. The machine according to claim 17 wherein the third pivot coupling is located at a height above that of the first and second coupling members.

19. The machine according to claim 17 wherein the third pivot coupling is connected to the second coupling member at a position thereon such that the mechanical drive connection passes underneath the third pivot coupling.

20. The machine according to claim 17 wherein the hoses flex to accommodate the side to side movement of the header.

* * * * *